US010358546B2

(12) United States Patent
Wang et al.

(10) Patent No.: US 10,358,546 B2
(45) Date of Patent: Jul. 23, 2019

(54) LOW EFO POLYPROPYLENE COMPOSITION

(71) Applicant: BOREALIS AG, Vienna (AT)

(72) Inventors: Jingbo Wang, Engerwitzdorf (AT); Claudia Kniesel, Leonding (AT); Petar Doshev, Linz (AT); Floran Prades, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/743,051

(22) PCT Filed: Jul. 27, 2016

(86) PCT No.: PCT/EP2016/067926
§ 371 (c)(1),
(2) Date: Jan. 9, 2018

(87) PCT Pub. No.: WO2017/021257
PCT Pub. Date: Feb. 9, 2017

(65) Prior Publication Data
US 2019/0077946 A1   Mar. 14, 2019

(30) Foreign Application Priority Data

Jul. 31, 2015   (EP) .................... 15179222

(51) Int. Cl.
*C08L 23/12*   (2006.01)
*C08L 23/06*   (2006.01)
*C08L 23/08*   (2006.01)
*C08L 23/14*   (2006.01)

(52) U.S. Cl.
CPC .............. *C08L 23/12* (2013.01); *C08L 23/06* (2013.01); *C08L 23/0815* (2013.01); *C08L 23/14* (2013.01); *C08L 2203/00* (2013.01); *C08L 2207/02* (2013.01); *C08L 2207/062* (2013.01); *C08L 2308/00* (2013.01)

(58) Field of Classification Search
CPC ...... C08L 23/12; C08L 23/06; C08L 23/0815; C08L 23/14; C08L 2203/02; C08L 2207/02; C08L 2207/002; C08L 2308/00
See application file for complete search history.

(56) References Cited

U.S. PATENT DOCUMENTS

| 6,317,189 | B1 | 11/2001 | Yuan et al. | |
| 2015/0099842 | A1* | 4/2015 | Gahleitner et al. | C08L 23/12 524/451 |

FOREIGN PATENT DOCUMENTS

| EP | 0 887 379 | 12/1998 |
| EP | 0 943 631 | 9/1999 |
| EP | 1 364 760 | 11/2003 |
| EP | 1 498 255 | 1/2005 |
| EP | 1 535 718 | 1/2005 |
| EP | 2 154 190 | 2/2010 |
| EP | 2 262 858 | 12/2010 |
| EP | 2 386 602 | 11/2011 |
| EP | 2 530 116 | 12/2012 |
| EP | 2 650 329 | 10/2013 |
| EP | 1 741 725 | 4/2014 |
| RU | 2506288 | 2/2014 |
| WO | 92/12182 | 7/1992 |
| WO | 99/24478 | 5/1999 |
| WO | 99/24479 | 5/1999 |
| WO | 00/68315 | 11/2000 |
| WO | 03/042260 | 5/2003 |
| WO | 2004/000899 | 12/2003 |
| WO | 2004/111095 | 12/2004 |
| WO | 2011076611 | 6/2011 |
| WO | 2013/007650 | 1/2013 |
| WO | 2015/070360 | 5/2015 |

OTHER PUBLICATIONS

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134, Wiley InterScience.
Cheng, H.N., "C NMR Analysis of Ethylene-Propylene Rubbers," Macromolecules, vol. 17, 1984, pp. 1950-1955, American Chemical Society.
"Dispersity in Polymer Science," International Union of Pure and Applied Chemistry, 2009, pp. 351-353, vol. 81, No. 2.
Hopfer, et al., "Combining different analytical approaches to identify odor formation mechanisms in polyethylene and polypropylene," Anal Bioannal Chem, 2012, pp. 903-919, vol. 402, Springer-Verlag.
Koch, et al., "Evaluation of scratch resistance in multiphase PP blends," Polymer Testing, 2007, pp. 927-936, vol. 26, Elsevier Ltd.
Resconi, et al., "Selectivity in Propene Polymerization with Metallocene Catalysts," Chem. Rev., vol. 100, 2000, pp. 1253-1345, American Chemical Society.
Singh, et al., Triad Sequence Determination of Ethylene-Propylene Copolymers—Application of Quantitative 13C NMR, Polymer Testing, 29, 2009, pp. 475-479, Elsevier, Ltd.
Soares, Joao B.P., "Fractionation," Encyclopedia of Polymer Science and Technology, pp. 75-131, vol. 10, John Wiley & Sons, Inc.
Wang, et al., "Structural Analysis of Ethylene/Propylene Copolymers Synthesized with a Constrained Geometry Catalyst," Macromolecules, vol. 33, 2000, pp. 1157-1162, American Chemical Society.

(Continued)

*Primary Examiner* — Nathan M Nutter
(74) *Attorney, Agent, or Firm* — Lowenstein Sandler LLP

(57) ABSTRACT

Polymer composition comprising at least one polypropylene homopolymer and/or random copolymer, up to 15 wt % of at least one polyethylene, optionally at least one elastomer in an amount of 8 to 40 wt % and optionally fillers and/or additives in an amount of up to 45 wt % based on the total weight of the final polymer composition with the at least one polyethylene having a density of higher than 940 kg/m3, a content of hexane hot extractables of below 0.80 wt % preferably below 0.60 wt %, most preferably below 0.40 wt % and a copolymer/homopolymer (COHO) ratio measured by Temperature Rising Elution Fraction (TREF) up to 6%.

20 Claims, No Drawings

(56) References Cited

OTHER PUBLICATIONS

Zhou, et al., "A new decoupling method for accurate quantification of polyethylene copolymer composition and triad sequence distribution with 13C NMR," Journal of Magnetic Resonance, vol. 187, 2007, pp. 225-233, Elsevier, Ltd.
Notification of Transmittal of the International Search Report and the Written Opinion of the International Searching Authority, or the Declaration for International Application No. PCT/EP2016/067926, dated Sep. 13, 2016, 10 pgs.
European Search Report for European Application No. 15179222.3 dated Jan. 13, 2016, 5 pages.
Office Action for Russian Application No. 2018104984104 dated Apr. 15, 2019, English translation, 6 pages.

\* cited by examiner

LOW EFO POLYPROPYLENE COMPOSITION

CROSS-REFERENCE TO RELATED APPLICATION(S)

This application is a national phase of International Application No. PCT/EP2016/067926, filed on Jul. 27, 2016, which claims the benefit of European Patent Application No. 15179222.3, filed on Jul. 31, 2015. The contents of these applications are hereby incorporated by reference in their entirety.

The present invention is directed to a new polymer composition comprising at least one polypropylene homopolymer and/or random copolymer and up to 15 wt % of at least one polyethylene. It further relates to the use of at least one polyethylene for the production of polymer compositions, to a method for producing articles comprising the composition and to articles made therefrom.

Automotive interior parts like dashboards, door claddings, trims etc. are commonly made from polymers; especially propylene based resins are widely used for these applications. It is often tried to maintain the high-quality perception till the end of the car's lifetime and therefore the polymer should provide high resistance to scratches e.g. from keys, fingernails, rings etc. In comparison to metals polymers have rather low stiffness and low surface hardness and thus are much more prone to scratches. In order to achieve a good scratch resistance of the end product quite often auxiliary substances, such as for example HDPE and/or slip agents are added to the polymer. Moreover for automotive interior parts in the recent years a stronger focus has been set on reducing emissions and odour and improving organoleptic properties of the polymer compositions. Especially low emissions as well as low amounts of volatile organic compounds and fogging are key issues in such applications.

In the field of plastics, the term "emission" means the release of volatile organic compounds due to the thermal decomposition and oxidation of the polymer. It is commonly known from literature (e.g. Hopfer H., Anal. Bioanal. Chem., 2012, 402(2), 903-19) that emissions and odours are mainly originating from primary polymerization products, degradation products and additives. Although the phenomenon is increased in the case of high temperatures e.g. during the extrusion or compounding step of the polymer composition, emissions and odours also occur in the automotive interior end products at normal atmospheric temperatures. Some of the emitted volatile substances can form milky precipitates ("Fogging") on the windscreen which of course have a negative influence on the visibility and thereby effect the safety of driver and passengers. Furthermore the odour of those substances is normally rather unpleasant, if not hazardous for health.

From a chemical point of view, emissions are light, short-chain alkanes to oligomers. Volatile organic compounds (VOC) are defined as emissions of very light to light alkanes with a chain length of $C_4$ to $C_{20}$, whereas the FOG value is defined as emissions of additives, alkanes and oligomers with a chain length of $C_{16}$ to $C_{32}$. The term Fogging indicates the emission of additives and oligomers with a chain length of $>C_{30}$. The bad odour of such polymer compositions is primarily caused by aldehydes and ketones as oxidation products. Propylene contains approximately 15 to 30 odourous substances such as e.g. (E)-2-heptanal, heptanal, octanal or decanal. In the field of polymers emission-, FOG- and odour-values are often summarized under the term EFO.

In the prior art there are many documents available which deal with the EFO problem of polymer compositions for automotive interior applications.

EP 1 535 718 and EP 1 498 255 disclose processes where volatile compounds are removed from a filled thermoplast by applying a vacuum during the compounding step. The volatiles are thus removed by vacuum degassing or by steam-stripping prior to the extrusion step. EP 2 154 190 and EP 1 364 760 disclose processes where special additives such as high performance stabilizers and absorbers or two different types of polymers are used in order to decrease the volatiles content in the final polymer product. These processes however involve increased investment costs and reduced output rates, deteriorating the economic situation of the resulting products.

EP 2 530 116 A1 discloses a polypropylene composition suitable for automotive interior applications comprising a heterophasic propylene copolymer, a triazine derivative and optionally a polyethylene with a density of at least 954 $kg/m^3$. Furthermore a slip agent and other additives can also be contained. The composition and the articles made therefrom have reduced amounts of volatiles. However the document is completely silent about the scratch resistance of the resulting polypropylene composition.

From EP 2262858 B1 a polymer composition with low amounts of volatiles and fogging and good mechanical properties such as a good scratch resistance is known. The composition comprises a propylene homopolymer, an ethylene copolymer with one or more comonomers selected from alpha-olefins with 4 to 12 carbon atoms and an ethylene homopolymer. The ethylene homopolymer is present in an amount of up to 15 wt %, it has a density of at least 940 $kg/m^3$ and has been produced by a polymerization process where a conventional Ziegler Natta catalyst has been used. It can be seen from the examples that with the addition of the Ziegler Natta based ethylene homopolymer to the propylene-ethylene copolymer matrix both the VOC and Fogging values are considerably increased. Moreover compositions with satisfying EFO values are limited to the use of propylene homopolymer materials produced with metallocene catalysts.

Although much has been done to reduce EFO in the field of polypropylene compositions for automotive interior industry, it is still a quite challenging problem to combine all the mentioned requirements. A particular drawback of the commonly used Ziegler Natta based auxiliary substances such as e.g. HDPE or polypropylene homopolymers is that they enhance the EFO values of the polymer matrix material considerably when added to it. Moreover when a slip agent is added too, it seems, although the VOC value decreases, that the slip agent has an antagonistic effect on the FOG value, so that the FOG value is even worse than with only the Ziegler Natta HDPE. So there is a need to find an auxiliary substance which has a good effect on mechanical properties especially on scratch resistance and at the same time does not have a negative impact on the EFO values. Moreover the auxiliary substance should not have an antagonistic effect with a possibly added slip agent.

It is therefore an object of the present invention to provide polymer compositions which fulfill both the requirement of good mechanical properties such as high scratch resistance and at the same time show low amounts of emissions, FOG and odours (EFO) without employing an auxiliary substance that increases the EFO values of the matrix materials.

Surprisingly this problem has been solved by a polymer composition comprising
- a) at least one polypropylene homopolymer and/or random copolymer,
- b) from 0.1 up to 15 wt % of at least one polyethylene,
- c) optionally at least one elastomer in an amount of 8 to 40 wt % and
- d) optionally fillers and/or additives in an amount of up to 45 wt % based on the total weight of the final polymer composition, with the at least one polyethylene having a density of higher than 940 kg/m$^3$, a content of hexane hot extractables of below 0.80 wt %, preferably below 0.60 wt %, most preferably below 0.40 wt % and a copolymer/homopolymer (COHO) ratio measured by Temperature Rising Elution Fraction (TREF) of up to 6%.

It has surprisingly been found that a polymer composition containing the special polyethylene component b) shows high scratch resistance and reduced EFO values. When adding the special polyethylene component b) to the matrix material there is a positive effect on the scratch resistance without deteriorating the VOC/FOG values of the matrix material. Moreover this special polyethylene component b) also has much less contribution to the heaviest fraction (Fogging) than conventional ZN based auxiliary materials. In addition to that when a slip agent is used in combination no antagonistic effect is shown with regard to the EFO, especially the FOG value. In addition to that a wide range of polypropylene matrix materials which still show good properties in the final polymer compositions can be used. In the polymer compositions according to the present invention a scratch resistance of below 3, an odour value of below 3.5 and a simultaneous increase of the FOG value of not more than 40%, the VOC value of not more than 35% and the Fogging of not more than 300% is achieved compared to the polypropylene matrix material. Thus the polymer composition according to the present invention fulfills all requirements for being successfully applied in the automotive industry.

Thus in a first aspect, the invention is directed to a polymer composition comprising
- a) at least one polypropylene homopolymer and/or random copolymer,
- b) from 0.1 up to 15 wt % of at least one polyethylene,
- c) optionally at least one elastomer in an amount of 8 to 40 wt % and
- d) optionally fillers and/or additives in an amount of up to 45 wt % based on the total weight of the final polymer composition, with the at least one polyethylene having a density of higher than 940 kg/m$^3$, a content of hexane hot extractables of below 0.80 wt %, preferably below 0.60 wt %, most preferably below 0.40 wt % and a copolymer/homopolymer ratio (COHO ratio) measured by Temperature Rising Elution Fraction (TREF) of up to 6%.

Composition

Essential components of the polymer composition according to the invention are a) at least one polypropylene homopolymer and/or polypropylene random copolymer and b) at least one polyethylene in an amount of from 0.1 up to 15 wt % based on the final polymer composition. In a preferred embodiment the polymer composition of the present invention comprises additionally at least one elastomer in an amount of 8 to 40 wt % based on the total weight of the final polymer composition and/or fillers and/or additives in an amount of up to 45 wt % based on the total weight of the final polymer composition. The sum of the percentage amount of the individual components of the polymer composition is equal to 100 percent.

It is important that also the mechanical properties of the final polymer composition fulfil relevant requirements such as the impact strength at −20° C. being >2 kJ/m$^2$ and the tensile modulus being >1800 MPa.

In a preferred embodiment the polymer composition of the present invention comprises:
- a) at least one polypropylene homopolymer and/or random copolymer,
- b) 5 to 15 wt % of at least one polyethylene having a density of higher than 940 kg/m$^3$, a content of hexane hot extractables of below 0.80 wt %, preferably below 0.60 wt %, most preferably below 0.40 wt % and a copolymer/homopolymer ratio (COHO ratio) measured by Temperature Rising Elution Fraction (TREF) of up to 6%,
- c) an elastomer in an amount of 10 to 30 wt %,
- d) up to 30 wt % fillers and
- e) up to 4 wt % additives, based on the total weight of the final polymer composition.

The amount in wt % of the polypropylene component a) is the balance to 100 wt % based on the total weight of the final polymer composition.

In a furthermore preferred embodiment the polymer composition of the present invention comprises:
- a) at least one polypropylene homopolymer and/or random copolymer,
- b) 5 to 15 wt % of at least one polyethylene having a density of higher than 940 kg/m$^3$, a content of hexane hot extractables of below 0.80 wt %, preferably below 0.60 wt %, most preferably below 0.40 wt % and a copolymer/homopolymer ratio (COHO ratio) measured by Temperature Rising Elution Fraction (TREF) of up to 6%,
- c) an elastomer in an amount of 10 to 30 wt %,
- d) 5 to 30 wt % talc as a filler and
- e) up to 4 wt % additives comprising 2 to 3 wt % of a colour masterbatch and 1 wt % of other additives, based on the total weight of the final polymer composition.

The amount in wt % of the polypropylene component a) is the balance to 100 wt % based on the total weight of the final polymer composition.

In a preferred option the polymer composition according to the present invention contains up to 1 wt %, preferably up to 0.5 wt % most preferably up to 0.2 wt % of a slip agent, based on the total weight of the final polymer composition.

When the polymer composition of the present invention, in addition to the at least one polyethylene component b), comprises a slip agent, excellent values for the scratch resistance in the final polymer composition are achieved. As there is no antagonistic effect of the polyethylene employed in the present invention with the slip agent, regarding the EFO values, it is especially preferred to have a slip agent in the final polymer composition.

Further it is appreciated that the polymer composition according to the present invention has an MFR$_2$ (230° C.) measured according to ISO1133 in the range of 5-100 g/10 min, preferably in the range of 10-90 g/10 min, most preferably in the range of 20-50 g/10 min The polymer composition of the present invention can be prepared by any suitable method known in the art, such as by blending the propylene homopolymer and/or random copolymer with the other components either directly, e.g., in an extruder, such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or a twin screw extruder may be used.

Component a) Propylene Homopolymer and/or Propylene Random Copolymer

The at least one polypropylene component a) of the present invention may consist of a propylene homopolymer or of a propylene random copolymer or of mixtures of a propylene homopolymer and a propylene random copolymer. In the case of a propylene homopolymer, component a) may consist of a single propylene homopolymer, but may also comprise a mixture of different propylene homopolymers. Ideally, however, a single polymer, like a single propylene homopolymer is present. The expression "propylene homopolymer" as used in the instant invention relates to a polypropylene that consists substantially, i.e. of equal to or more than 99 wt %, more preferably equal to or more than 99.5 wt %, like equal or more than 99.8 wt %, of propylene units. In a preferred embodiment only propylene units in the propylene homopolymer are detectable. The comonomer content can be determined with Nuclear Magnetic Resonance (NMR) Spectroscopy. In the case that component a) consists of a propylene random copolymer, either a single propylene random copolymer or a mixture of different propylene random copolymers can be contained. The propylene random copolymer comprises monomers copolymerizable with propylene, for example comonomers such as ethylene and/or C4 to C8 α-olefins and mixtures thereof, in particular the comonomers are ethylene and/or C4 to C6 α-olefins, e.g. 1-butene and/or 1-hexene.

In a preferred embodiment, the polymer composition of the present invention comprises as the only polypropylene of component a) at least one polypropylene homopolymer.

Especially preferred is a polypropylene homopolymer produced in a polymerisation process in the presence of a single site metallocene catalyst, for example under the conditions of a Borealis Borstar® process. It is especially preferred if the polypropylene homopolymer of component a) has an $MFR_2$ (230° C.) of equal to or higher than 20 g/10 min measured according to ISO 1133.

The comonomer content of the at least one propylene homopolymer or random copolymer of component a) is preferably up to 6 wt %. In case of component a) being a propylene homopolymer the comonomer content is from 0 to 1 wt % with the comonomers being preferably ethylene comonomers. In case of component a) being a propylene random copolymer the comonomer content is from 2 to 6 wt %.

Preferably the at least one polypropylene homopolymer and/or random copolymer of component a) of the polymer composition according to the present invention has a melt flow rate $MFR_2$ (230° C.) measured according to ISO 1133 in the range of 1 to 1000 g/10 min, preferably in the range of 10 to 500 g/10 min, most preferably in the range of 20 to 200 g/10 min.

It is important that the MFR is within the specified ranges, as a too low MFR in the polypropylene homopolymer and/or random copolymer leads to technical problems during injection moulding as the polymer does not fill the mould properly. When however the MFR of the polypropylene is too high the mechanical properties of the final polymer composition become insufficient.

In a preferred embodiment the at least one polypropylene homopolymer and/or random copolymer of component a) of the polymer composition according to the present invention has a content of the xylene cold soluble (XCS) fraction in the range of 0.1 to 6 wt %, preferably in the range of 0.3 to 4 wt %, most preferably in the range of 0.5 to 1.5 wt %.

Additionally, it is preferred that the at least one polypropylene homopolymer and/or random copolymer of component a) of the polymer composition according to the present invention has a glass transition temperature (Tg) in the range of −10 to +10° C.

The at least one propylene homopolymer of component a) may be produced by a single- or multistage polymerization process of propylene such as a bulk polymerization, gas phase polymerization, slurry polymerization, solution polymerization or combinations thereof. A propylene homopolymer can for example be made either in one or more loop reactors or in a combination of loop and gas phase reactor. The at least one propylene random copolymer of component a) may be produced by a single- or multistage polymerization process of propylene and monomers copolymerizable with propylene, such as for example by bulk polymerization, gas phase polymerization, slurry polymerization, solution polymerization or combinations thereof. A propylene random copolymer can for example be made either in one or more loop reactors or in a combination of loop and gas phase reactors. A preferred multistage process for the production of the at least one polypropylene homopolymer or the at least one polypropylene random copolymer according to component a) of the present invention is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315. All those processes are well known to one skilled in the art.

During the polymerization of the at least one polypropylene homopolymer or the at least one polypropylene random copolymer according to component a) of the invention a ZN or a single site catalyst can be used. An example of a single site catalyst is a metallocene catalyst. A suitable catalyst for the polymerization can be any stereospecific catalyst for propylene polymerization which is capable of polymerizing propylene and copolymerising propylene and ethylene and/ or α-olefins at a temperature of 40 to 110° C. and at a pressure from 10 to 100 bar. Preferably, the at least one propylene homopolymer or at least one propylene copolymer according to component a) of this invention has been produced in the presence of a metallocene catalyst. Such metallocene catalysts are described for example in EP 1741725 A1 and EP 0943631 A1. Suitable Ziegler-Natta (ZN) catalysts are disclosed in e.g. WO 03/042260.

Component b) Polyethylene

Component b) of the present polymer composition is at least one polyethylene having a density of higher than 940 kg/m³, preferably higher than 955 kg/m³, most preferably in the range of 955 to 975 kg/m³. That means that component b) is a high density polyethylene (HDPE). The content of hexane hot extractables of the HDPE in the present polymer composition is below 0.80 wt %, preferably below 0.60 wt %, most preferably below 0.40 wt %. For the description of the measuring method of the hexane hot extractable content reference is made to the experimental section below. The copolymer/homopolymer (COHO) ratio measured by Temperature Rising Elution Fraction (TREF) of the HDPE in the polymer composition of the present invention is up to 6%. For the description of the measuring method of the COHO ratio reference is made to the experimental section below.

The at least one polyethylene of component b) of the polymer composition of the present invention can be produced by a polymerization process in the presence of a Ziegler Natta catalyst or a single site catalyst, e.g. a Metallocene catalyst. It is preferred that the HDPE is produced in the presence of a Ziegler Natta (ZN) catalyst, especially preferred a highly efficient ZN catalyst. Ziegler Natta catalysts are well known to those skilled in the art. Suitable ZN catalysts for the production of component b) of the polymer composition of the present invention are for example the ones disclosed in U.S. Pat. No. 6,317,189, the content of which is incorporated herein by reference. HDPE which is suitable as component b) in the polymer composition of the present invention is commercially available, such products are for example SCLAIR® 15A, 19A or SCLAIR® IG464-C from Nova Chemicals or DOWLEX® 2006G, DOWLEX® IP10 from Dow Chemicals.

In a preferred option the at least one polyethylene of component b) of the composition according to the present invention has a molar-mass dispersity, $D_M$ of 2.5-4. According to IUPAC recommendation "Dispersity in Polymer Science", Pure Appl. Chem., Vol. 81, No. 2, pp. 351-353, 2009, the molar-mass dispersity $D_M$ (or relative-molecular-mass dispersity or molecular-weight dispersity) defines the ratio of the mass-average molar mass, relative molecular mass, or molecular weight, $M_w$, to the number-average molar mass, relative molar mass, or molecular weight, $M_n$. Therefore: $D_M = M_w/M_n$.

The content of the at least one polyethylene of component b) in the polymer composition according to the present invention is up to 15 wt %, a suitable minimum amount is 0.1 wt %. Preferably the content of the polyethylene is in the range of 5 to 10 wt %, based on the total weight of the final polymer composition.

Preferably the at least one polyethylene of component b) of the polymer composition according to the present invention has a comonomer content of 0 to 0.5 wt %, based on the weight of the total of polyethylene component b). Preferred comonomers are those having 4 to 8 carbon atoms.

Additionally it is preferred that the at least one polyethylene of component b) of the polymer composition according to the present invention has a $MFR_2$ (190° C.) measured according to ISO 1133 of 0.2 to 15 g/10 min, preferably of 0.3 to 10 g/10 min.

Component c) Elastomer

Optionally the polymer composition of the present invention comprises additionally an elastomer component c) in an amount of 8 to 40 wt %, preferably of up to 30 wt %, most preferably of up to 20 wt % based on the total weight of the final polymer composition. The at least one elastomer component c) in the polymer composition of the present invention can be an elastomer which has been produced ex situ. In this case the elastomer can be for example an ethylene- or higher-α-olefin-based 1-butene to 1-octene elastomer such as preferably an Ethylene Propylene Rubber (EPR), Ethylene Propylene Diene Monomer (EPDM) or a styrene elastomer like for example Styrene-Ethylene Butadiene Styrene (SEBS). Preferably, the elastomers are either 1-octene ethylene copolymers or 1-butene ethylene copolymers. Examples of possible elastomers are the Queo® grades distributed by Borealis or Engage® products from Dow. In this case the elastomer can be added to the polymer composition by compounding it into the propylene homopolymer and/or random copolymer component a) by any suitable method known in the art, such as by blending the elastomer component c) with the other components either directly, e.g. in an extruder such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or twin screw extruder may be used.

It is however also possible that the at least one elastomer contained as component c) in the polymer composition of the present invention has been produced in situ, that is by multistage copolymerization of the propylene homopolymer and/or random copolymer of component a) with the comonomers. Thus the elastomeric component c) is in this set-up produced directly in the polymerization reaction step. In the case of in-situ production of the elastomer preferably ethylene or higher α-olefins like C4 to C8 are used as comonomers to the polypropylene component a) so that an elastomeric propylene copolymer is received as elastomer component c). Most preferably the elastomeric compound is an Ethylene Propylene Rubber (EPR). The resulting polymer composition comprising components a) and c) is often called a "heterophasic copolymer" (HECO). Such a HECO is preferably obtained by a sequential polymerization process which indicates a process with at least two, optionally three reactors connected in series. A preferred multistage process involves a slurry reactor, like a loop reactor, a first gas phase reactor and a second gas phase reactor. Such a preferred multistage process is e.g. Borealis' BORSTAR® technology or the Spheripol® process of Basell.

In a preferred embodiment, an in situ produced elastomer component c) is present in the polymer composition of the present invention with the comonomer content of the HECO being in the range of 4 to 20 wt %, more preferably in the range of 4 to 15 wt %, most preferably in the range of 4 to 10 wt %. Furthermore it is preferred that the HECO has a melting temperature determined by differential scanning calorimetry (DSC) in the range of 140 to 170° C. and a xylene cold soluble (XCS) content in the range of 8 to 35 wt.-%.

However, if the at least one elastomer component c) is present, then the final polymer composition according to the invention comprises a matrix being a propylene homopolymer and/or a propylene random copolymer and an elastomeric component c) contained as (finely) dispersed inclusions in the matrix. Said inclusions containing the elastomeric component c) form a different phase within the polymer composition and are for instance visible by high resolution microscopy, like electron microscopy (EM), atomic force microscopy (AFM) or by dynamic mechanical thermal analysis (DMTA).

If an elastomer component c) is present in the polymer composition of the invention, at least two distinct glass transition temperatures can be identified. The higher first glass transition temperature Tg(1) represents the polypropylene matrix, whereas the lower second glass transition temperature Tg(2) represents the elastomeric compound of the polymer composition.

Component d) Fillers/Additives

Fillers and/or additives may be contained in the polymer composition of the present invention in an amount of up to 45 wt % based on the total weight of the final polymer composition.

It is preferred that the amount of fillers and/or additives is up to 35 wt % with the amount of fillers being up to 30 wt % and the amount of additives being up to 5 wt %, preferably up to 3 wt %, most preferably up to 1 wt %, based on the total weight of the final polymer composition.

As for fillers any mineral filler can be used in the present invention. However it is preferred that the mineral filler is a phyllosilicate, mica or wollastonite. Even more preferred the mineral filler is selected from the group consisting of mica, wollastonite, kaolinite, smectite, montmorillonite and talc. The most preferred inorganic filler is talc. Preferably, the mineral filler has a median particle size d50 [mass percent]

of equal to or below 10 µm, more preferably below 5.0 µm, like below 3.0 µm. The mineral filler preferably has a cutoff particle size d95 [mass percent] of equal to or below 20.0 µm, more preferably below 10.0 µm, like below 8.0 µm. Typically the mineral filler has a surface area of less than 50 m$^2$/g, more preferably of less than 30 m$^2$/g, yet more preferably of less than 25 m$^2$/g. Mineral fillers fulfilling these requirements are preferably anisotropic mineral fillers, like talc, mica and wollastonite.

Possible additives are for example slip agents, nucleating agents, antioxidants, antiblocking agents, UV-stabilizers, lubricants, colouring agents, foaming agents or the like.

Suitable slip agents are for example those being unsaturated fatty acid amides. The amount of carbon atoms of the fatty acids is preferably in the range of 10 to 25. A preferred slip agent is (Z)-docos-13-enamide (Erucamide), CAS No. 112-84-5 with the trade name: Crodamide ER-BE-(HU), from Croda.

Suitable additives and fillers are well known in the art and can be found for example in the "Additives for Plastics" Handbook, J. Murphy, Elsevier, 2$^{nd}$ edition, 2001. The additives can be added as pure agents or as masterbatches, such as for example as colour masterbatches. Those methods are well known in the art too.

In a second aspect the invention is directed to the use of at least one polyethylene having a density of higher than 940 kg/m$^3$, a content of hexane hot extractables of below 0.80 wt %, preferably below 0.60 wt %, most preferably below 0.40 wt %, a Comonomer/Homopolymer (COHO) ratio measured by Temperature Rising Elution Fraction (TREF) of up to 6%, for the production of polymer compositions having a scratch resistance of below 3, an odour value of below 3.5 and a simultaneous increase of the FOG value of not more than 40%, the VOC value of not more than 35% and the Fogging of not more than 300% compared to the polymer matrix material.

Such polymer compositions are especially suitable for e.g. automotive or household applications as they combine a good scratch resistance with good EFO values and good mechanical properties. A special advantage is that no antagonistic effect can be observed with the HDPE, especially with regard to the FOG value, when a slip agent is added to the composition too. This means that compared to polymer compositions comprising as an auxiliary agent conventional polyethylene obtained in the presence of a ZN catalyst, the emission values, FOG and fogging are reduced. Finally, it is possible to use a wide range of matrix materials in order to produce suitable compositions for automotive industry, especially automotive interior industry.

In a further aspect, the invention is directed to a process for producing articles with reduced EFO characterized in that a polymer composition according to the present invention is used. For the production of the articles all processes known in the art such as e.g. injection moulding, can be used.

In a still further aspect, the invention is directed to an article comprising a polymer composition according to the invention. The articles are preferably automotive interior articles or houseware articles, that is preferably injection molded articles. Such automotive interior articles are for example dash boards, instrument panels, door claddings, arm rests, gear sticks, shift lever knobs, mats, interior skins, map pockets, column trims, trunk claddings or interior trims in general. Of course, the inventive polypropylene composition can also be used for automotive exteriors, like e.g. bumpers, side trims, step assists, body panels, spoilers and the like. Examples for houseware articles are e.g. food storage boxes, drinking bottles, chopping boards, baskets, lunch boxes, kitchenware, interior decorating products and the like. The present invention also provides articles, (for example automotive and houseware) like injection molded articles, comprising at least 60 wt %, preferably at least 80 wt %, more preferably at least 95 wt %, and most preferably consisting of the inventive composition.

In the following the present invention is further illustrated by means of examples, without being limited to them.

EXAMPLES

The following definitions of terms and determination methods apply for the above general description of the invention as well as to the below examples unless otherwise defined.

1. Measuring Methods

Quantification of Microstructure by NMR Spectroscopy

Quantitative nuclear-magnetic resonance (NMR) spectroscopy was used to quantify the comonomer content of the polymers. Quantitative 13C{1H} NMR spectra were recorded in the solution-state, using a Bruker Advance III 400 NMR spectrometer operating at 400.15 and 100.62 MHz for 1H and 13C respectively. All spectra were recorded using a 13C optimised 10 mm extended temperature probe head at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent as described in G. Singh, A. Kothari, V. Gupta, Polymer Testing, 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson., 187 (2007), 225 and V. Busico, P. Carbonniere, R. Cipullo, C. Pellecchia, J. Severn, G. Talarico, Macromol. Rapid Commun., 2007, 28, 1128. A total of 6144 (6 k) transients were acquired per spectra. Quantitative 13C {1H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1-erythro regio defects observed (as described in L. Resconi, L. Cavallo, A. Fait, F. Piemontesi, Chem. Rev. 2000, 100 (4), 1253, in Cheng, H. N., Macromolecules, 1984, 17, 1950, and in W-J. Wang and S. Zhu, Macromolecules, 2000, 33, 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules, 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules, 2000, 33, 1157, through integration of multiple signals across the whole spectral region in the $^{13}C\{1H\}$ spectra. This method was chosen for its robust nature and ability to account for the presence of regio-defects when needed. Integral regions were slightly adjusted to increase applicability across the whole range of encountered comonomer contents. The mole percent comonomer incorporation was calculated from the mole fraction. The weight percent comonomer incorporation was calculated from the mole fraction.

Comonomer Content in Polyethylene (HDPE)

The comonomer content in polyethylene was measured in a known manner based on Fourier transform infrared spectroscopy (FTIR) calibrated with $^{13}C$-NMR, using Nicolet Magna 550 IR spectrometer together with Nicolet Omnic FTIR software.

Films having a thickness of about 250 µm were compression moulded from the samples. Similar films were made from calibration samples having a known content of the comonomer. The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.

$MFR_2$ (230° C.) for Polypropylene:

The melt flow rate is measured as the $MFR_2$ in accordance with ISO 1133 (230° C., 2.16 kg load) for polypropylene. The MFR is an indication of the flowability, and hence the processability, of the polymer. The higher the melt flow rate, the lower the viscosity of the polymer.

$MFR_2$ (190° C.) for Polyethylene:

The melt flow rate (MFR) is determined according to ISO 1133 (190° C., 2.16 kg load) and is indicated in g/10 min. The MFR is an indication of the flowability, and hence the processability, of the polymer. The higher the melt flow rate, the lower the viscosity of the polymer. MFR may be determined at different loadings such as 2.16 kg ($MFR_2$), 5 kg ($MFR_5$) or 21.6 kg ($MFR_{21}$).

Density for HDPE:

The density of the polymer was measured according to ISO 1183-2. The sample preparation was executed according to ISO 1872-2 Table 3 Q (compression moulding).

Xylene Cold Solubles (XCS, Wt %):

The amount of the polymer soluble in xylene is determined at 25° C. according to ISO 16152; 5$^{th}$ edition; 2005-07-01.

The Hexane Extractable Fraction:

Hexane extractables were determined according to the following procedure. 1 g of the sample was put into a 300 ml Erlenmeyer flask and 100 ml of hexane was added. The mixture was boiled under stilling in a reflux condenser for 4 h. The hot solution was filtered through a folded filter paper and dried (in a vacuum oven at 90° C.) and weighted (0.0001 g exactly) in a round schlenk. The Erlenmeyer flask and the filter were washed with n-hexane. Then the hexane was evaporated under a nitrogen stream on a rotary evaporator. The round schlenk was dried in a vacuum oven at 90° C. overnight and was put into a desiccator for at least 2 hours to cool down. The schlenk was weighted again and the hexane soluble was calculated therefrom.

Melting Temperature ($T_m$):

measured with a TA Instrument Q200 differential scanning calorimeter (DSC) on 5 to 7 mg samples. DSC is run according to ISO 20 11357/part 3/method C2 in a heat/cool/heat cycle with a scan rate of 10° C./min in the temperature range of −30 to +225° C. Crystallization temperature (Tc) and crystallization enthalpy (Hc) are determined from the cooling step, while melting temperature (Tm) and melting enthalpy (Hm) are determined from the second heating step respectively from the first heating step.

Glass Transition Temperature Tg:

is determined by dynamic mechanical thermal analysis according to ISO 6721-7. The measurements are done in torsion mode on compression moulded samples (40×10×1 mm) between −100° C. and +150° C. with a heating rate of 2° C./min and a frequency of 1 Hz.

Intrinsic viscosity is measured according to DIN ISO 1628/1, October 1999 (in decalin at 135° C.).

Charpy Notched Impact Strength:

Charpy notched impact is measured according to ISO 179/1eA at +23° C. and at −20° C. using an injection moulded test specimen (80×10×4 mm) as produced according to ISO 1873.

Tensile Modulus and Tensile Strength:

The tensile properties were determined according to ISO 527-1 and 2 on injection moulded specimen, type 1B. The injection moulding is performed according to ISO 1873.

Scratch Resistance:

To determine the scratch visibility, a Cross Hatch Cutter Model 420P, manufactured by Erichsen, was used. For the tests, plaques of 70×70×4 mm size were cut from a moulded grained plaque of size 140×200×4 mm (grain parameters: average grain size=1 mm, grain depth=0.12 mm, conicity=6°). The period between injection moulding of specimens and scratch-testing was 7 days.

For testing, the specimens must be clamped in a suitable apparatus as described above. Scratches were applied at a force of 10 N using a cylindrical metal pen with a ball shaped end (radius=0.5 mm±0.01). A cutting speed of 1000 mm/min was used.

A minimum of 20 scratches parallel to each other were brought up at a load of 10 N with a distance of 2 mm The application of the scratches was repeated perpendicular to each other, so that the result was a scratching screen. The scratching direction should be unidirectional.

The scratch visibility is reported as the difference of the luminance, ΔL, of the unscratched and the scratched areas. ΔL values were measured using a spectrophotometer that fulfils the requirements to DIN 5033.

A detailed test description of the test method (Erichsen cross hatch cutter method) can be found in the article "Evaluation of scratch resistance in multiphase PP blends" by Thomas Koch and Doris Machl, published in Polymer Testing, 26 (2007), p. 927-936.

VOC:

determined according to VDA 278:2002 from pellets. VOC according to VDA 278 is the sum of all high and medium volatile compounds. It is calculated as toluene equivalent (TE). VOC according to VDA 278 represents all organic compounds in the boiling point and elution range of up to C20 (n-eicosane).

FOG:

determined according to VDA 278:2002 from pellets. FOG according to VDA 278 is the sum of all organic compounds of low volatility, which have an elution time greater than or equal to n-hexadecane. FOG is calculated as hexadecane equivalent (HD). FOG according to VDA 278 represents organic compounds in the boiling point range of n-alkanes C16 to C32.

VDA standards are issued by "Verband der Automobilindustrie". The VDA standards used herein are available from "Dokumentation Kraftfahrwesen (DKF); Ulrichstrasse 14, D-74321 Bietigheim-Bissingen, Germany or can be downloaded from their website (www.dkf-ev.de).

Fogging:

Fogging is measured on a 2 mm compression moulded specimen. Fogging means the evaporation of volatiles matters of trim materials of vehicles. The measurements were done on compression moulded specimens (diameter 80 mm+/−1 mm, thickness 2 mm) according to ISO 75201, method B. This method evaluates the volatility of organic constituents by gravimetric measurements. The samples were dried at room temperature for 24 h using silica gel in a desiccator. The test was done at 100° C. The beakers have to be closed by using tarred aluminium foils (diameter 103 mm, thickness 0.03 mm) and glass plates and the cooling plates on top. After the testing time (16 h at 100° C.) the glass plates have to be removed (not usefully anymore at this method), the aluminium foils are removed and weighted back. The gravimetric Fogging value "G" (%) shall be determined by the following equation:

G=weight of aluminium foil after Fogging test−tare of the aluminium foil, in mg

G sample=Average in mg of the 2 foils used for each sample

Total Volatiles:

the Total Volatiles value is determined according to VDA 277:1995 from pellets. The Total Volatiles value is the total emission of organic carbon, determined according to the method in VDA 277. This value represents the amount of organic compounds which are emitted by a test sample which compounds can be found in the interior of a car.

Odour:

Odour was determined according to VDA 270:1992 according to variant 3 from pellets with a panel of 7 people.

Evaluation Scale:

Grade 1 not perceptible
Grade 2 perceptible, not disturbing
Grade 3 clearly perceptible, but not disturbing
Grade 4 disturbing
Grade 5 strongly disturbing
Grade 6 not acceptable Molecular Weight Average and Molecular Weight Distribution (Mn, Mw, Mz, MWD):

Molecular weight averages ($M_z$, $M_w$ and $M_n$), molecular weight distribution (MWD) and its broadness, described by its molar-mass dispersity, $Đ_M=M_w/M_n$ (wherein $M_n$ is the number average molecular weight and $M_w$ is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \tag{1}$$

$$M_w = \frac{\sum_{i=1}^{N} (A_i \times M_i)}{\sum_{i=1}^{N} A_i} \tag{2}$$

$$M_z = \frac{\sum_{i=1}^{N} (A_i \times M_i^2)}{\sum_{i=1}^{N} (A_i / M_i)} \tag{3}$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5) from PolymerChar (Valencia, Spain) or differential refractometer (RI) from Agilent Technologies, equipped with 3× Agilent-PL gel Olexis and 1× Agilent-PL gel Olexis Guard columns was used. As the solvent and mobile phase 1,2,4-trichlorobenzene (TCB) stabilized with 250 mg/L 2,6-Di tert. butyl-4-methyl-phenol was used. The chromatographic system was operated at 160° C. and at a constant flow rate of 1 mL/min. 200 μL of sample solution was injected per analysis. Data collection was performed using either Agilent Cirrus software, version 3.3, or PolymerChar GPC-IR control software.

The column set was calibrated using universal calibration (according to ISO 16014-2:2003) with 19 narrow MWD polystyrene (PS) standards in the range of 0.5 kg/mol to 11,500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data. All samples were prepared in the concentration range of 0.5-1 mg/ml and dissolved at 160° C. for 2.5 hours for PP or 3 hours for PE under continuous gentle shaking.

TREF Method:

(running with method "Standard 180-35° C."): The chemical composition distribution was determined by analytical Temperature Rising Elution fractionation as described by Soares, J. B. P., Fractionation, In: Encyclopaedia Of Polymer Science and Technology, John Wiley & Sons, New York, pp. 75-131, Vol. 10, 2001. The separation of the polymer in TREF is according to their crystallinity in solution. The TREF profiles were generated using a CRYSTAF-TREF 200+ instrument manufactured by PolymerChar S.A. (Valencia, Spain).

The polymer sample was dissolved in 1,2,4-trichlorobenzene (TCB, stabilized with 250 mg/L 2,6-Di tert. butyl-4-methyl-phenol) at a concentration between 1.5 and 2.0 mg/ml at 150° C. for 180 min and 1.8 mL of the sample solution was injected into the column (8 mm inner diameter, 15 cm length, filled with inert e.g. glass beads). The column oven was then rapidly cooled to 110° C. and held at 110° C. for 30 min for stabilization purpose and it was later slowly cooled to 35° C. under a constant cooling rate (0.1° C./min). The polymer was subsequently eluted from the column with 1,2,4-trichlorobenzene (stabilized with 250 mg/L 2,6-di-tert-butyl-4-methyl-phenol) at a flow rate of 0.5 mL/min at 35° C. for a period of 10 min followed by a temperature increase from 35° C. to 135° C. at a constant heating rate of 0.5° C./min with a flow rate of 0.5 ml/min. The concentration of the polymer during elution was recorded by an infrared detector (measuring the C—H absorption at 3.5 micrometer wavelength). The detector response was plotted as a function of the temperature. The normalized concentration plot was presented as fractogram together with the cumulative concentration signal normalized to 100.

Definition of Homopolymer (HO) High Crystalline Fraction and Copolymer (CO) Low Crystalline Fraction:

The Homopolymer high crystalline fraction, so called HO fraction (for "homopolymer" high crystalline fraction) is the amount in wt % of the polymer fraction with elutes between 90° C. and 110° C. elution temperature and which mainly contains the homo-polyethylene chains or chains with a very low branching content.

The Copolymer low crystalline fraction, so called CO fraction (for "copolymer" low crystalline fraction) is the amount in wt % of the polymer fraction with elutes between 35° C. and 90° C.

The soluble fraction, so called "soluble TREF", is the amount in wt % of the polymer with elutes below 35° C.

The copolymer/homopolymer (COHO) ratio (in %) is defined:

COHO=((soluble TREF+CO fraction)/HO fraction)× 100 (in %)

Median Particle Size $d_{50}$ and Cut-Off Particle Size $d_{95}$ of Mineral Filler:

is calculated from the particle size distribution [mass percent] as determined by gravitational liquid sedimentation according to ISO 13317-3 (Sedigraph).

Surface Area of Mineral Filler:

BET with $N_2$ gas according to DIN 66131/2, apparatus Micromeritics Tristar 3000: sample preparation at a temperature of 50° C., 6 hours in vacuum.

2. Examples

TABLE 1

Polymerization details of PP1 , PP3 and PP4

|  | catalyst | Unit | PP1 cat 1 | PP3 cat 2 | PP4 cat 2 |
|---|---|---|---|---|---|
| Prepoly | Temperature | ° C. | 20 | 20 | 20 |
|  | Residence time | h | 0.32 | 0.32 | 0.32 |
| Loop | Temperature | ° C. | 80 | 75 | 70 |
|  | H2/C3 | mol/kmol | 0.41 | 0.25 | 0.26 |
|  | MFR | g/10 min | 44.5 | 28 | 35 |
|  | split | % | 76 | 68 | 35 |
| GPR1 | Temperature | ° C. | 80 | 70 | 85 |
|  | H2/C3 | mol/kmol | 4.64 | 2.7 | 2.4 |
|  | C2/C3 | mol/kmol | 0 | 0 | 249 |
|  | Split | % | 24 | 32 | 44 |
|  | C2 | wt % | 0 | 0 | 3.5 |
|  | MFR | g/10 min | 58 | 36 | 29 |
| GPR2 | Temperature | ° C. | n.a. | n.a. | 80 |
|  | H2/C3 | mol/kmol | n.a. | n.a. | 0 |
|  | C2/C3 | mol/kmol | n.a. | n.a. | 10944 |
|  | split | % | n.a. | n.a. | 21 |
|  | MFR | g/10 min | n.a. | n.a. | 12 |
| Pellets | MFR | g/10 min | 68 | 49 | 16 |
|  | XCS | wt % | 1.3 | 1.6 | 26 |
|  | IV | dg/l | n.m. | n.m. | 1.92 |
|  | C2 total | wt % | n.m. | n.m. | 17.5 |
|  | C2(XCS) | wt % | n.m. | n.m. | 30 |
|  | Tm | ° C. | 149 | 153 | 153 |

Table 1 shows the polymerization details of the polypropylene materials PP1, PP3 and PP4 referred to in Table 2 below. The materials have been polymerized in a multistage process which is a "loop-gas phase"-process (BORSTAR® technology of Borealis). Step 1 (loop) corresponds to a bulk homopolymerization with a loop reactor, step 2 to the first gas phase homopolymerization (GPR1) and step 3 (GPR2) to the second gas phase step, C2/C3 copolymerization. The PP pellets comprise 1500 ppm of B225 (BASF) and 500 ppm of calcium stearate (Ceasit AV-FI Veg, Baerlocher). The catalyst used has been prepared following the general procedures described in WO2013/007650 to prepare catalyst E2P, using the same metallocene complex (E2 in WO2013/007650) rac-anti-dimethylsilanediyl(2-methyl-4-(4'-tert-butylphenyl)inden-1-yl)(2-methyl-4-phenyl-5-methoxy-6-tert-butylinden-1-yl) zirconium dichloride. The composition of catalysts 1 and 2 is the following: Al/Zr (molar ratio) in unprepped catalyst: 300 for catalyst 1, 440 for catalyst 2. Degree of prepping (g(PP)/g(cat)) for catalyst 1 and catalyst 2: 3.5.

The final polypropylene compositions were prepared by melt blending the components on a co-rotating twin screw extruder type Coperion ZSK 40 (screw diameter 40 mm, L/D ratio 38) at temperatures in the range of 170–190° C., using a high intensity mixing screw configuration with two sets of kneading blocks.

Conventional HDPE is the commercial high density polyethylene (HDPE) "BB2581" of Borealis AG the properties of which are shown in Table 3 below. HDPE in the invention is the commercial HDPE "SCLAIR IG 464-C" of Nova Chemicals the properties of which are shown in table 3 below. Elastomer 1.8 is a commercial product ("Engage 8150") from Dow Chemicals with a density of 868 kg/m³ and a $MFR_2$ (190° C.) of 0.5 g/10 min.

Elastomer 1.1 is a commercial product ("Engage 8100") from Dow Chemicals with a density of 870 kg/m³ and a $MFR_2$ (190° C.) of 1 g/10 min Slip agent is (Z)-docos-13-enamide (Erucamide), CAS No. 112-84-5 with the trade name Crodamide ER-BE-(HU), from Croda. Talc 3.9: is the commercial product Luzenac HAR T84, particle size top cut>15 µm: <2%, d50 12 µm.

$$\Delta Fogging = \frac{Fogging\ of\ blends - Fogging\ of\ blank}{Fogging\ of\ blank} \times 100\%$$

$$\Delta VOC = \frac{VOC\ of\ blends - VOC\ of\ blank}{VOC\ of\ blank} \times 100\%$$

$$\Delta Fog = \frac{Fog\ of\ blends - Fog\ of\ blank}{Fog\ of\ blank} \times 100\%,$$

with 'blank' referring to materials that do not comprise any PE and/or slip agent.

TABLE 2

Mechanical properties and EFO values of Polymer composition

|  | C.E.3 | C.E.4 | C.E.6 | C.E.1 | C.E.2 | I.E.1 | I.E.2 |
|---|---|---|---|---|---|---|---|
| PP1 = HF SSC Homo/wt % |  |  |  | 59.0 | 52.0 | 52.0 | 52.0 |
| PP3 = HF Homo MFR50/wt % | 41.5 | 34.5 | 34.5 |  |  |  |  |
| PP4 = PP random copo with elastomer/wt % | 20.0 | 20.0 | 20.0 |  |  |  |  |
| Elastomer 1.8/wt % | 12.0 | 12.0 | 12.0 |  |  |  |  |
| Elastomer 1.1/wt % |  |  |  | 17.0 | 17.0 | 17.0 | 17.0 |
| HDPE conventional/wt % |  | 7.0 | 7.0 |  | 7.0 |  |  |
| HDPE of invention/wt % |  |  |  |  |  | 7.0 | 7.0 |
| Slip agent/wt % |  |  | 0.2 |  |  |  | 0.2 |
| Talc 3.9/wt % | 15.0 | 15.0 | 15.0 | 15.0 | 15.0 | 15.0 | 15.0 |
| MFR/g/10 min | 17 | 12 | 12 | 28 | 21 | 23 | 29 |
| Impact strength at 23° C./kJ/m$^2$ | 6.6 | 12.6 | 14.9 | 5.2 | 8.9 | 8.6 | 8.7 |
| Impact strength at −20° C./kJ/m$^2$ | 2.5 | 2.6 | 2.6 | 2.4 | 2.5 | 2.5 | 2.5 |
| Tensile modulus/MPa | 1882 | 1727 | 1772 | 2197 | 2002 | 2020 | 1929 |
| Tensile strength/MPa | 24 | 24 | 23 | 26 | 25 | 25 | 25 |
| Scratch Delta L | 5.09 | 2.77 | 0.03 | 3.26 | 1.98 | 2.6 | 0.14 |

|  | no HDPE, no Slip agent | conventional HDPE | conventional HDPE + Slip agent | no HDPE, no Slip agent | conventional HDPE | HDPE of invention | HDPE of invention + Slip agent |
|---|---|---|---|---|---|---|---|
| Total emission/μgC/g | 14 | 12 | 12 | 21 | 23 | 22 | 12 |
| Odour (mean) | 4.4 | 4.4 | 3.9 | 3.1 | 3 | 3.4 | n.m. |
| FOG/μgHD/g | 50 | 90 | 114 | 84 | 122 | 91 | 88 |
| ΔFOG/% | 0 | 80 | 128 | 0 | 45 | 8 | 5 |
| VOC/μgTE/g | 44 | 72 | 62 | 53 | 75 | 51 | 59 |
| ΔVOC/% | 0 | 64 | 41 | 0 | 42 | −4 | 11 |
| Fogging/mg | 0.14 | 0.24 | 0.43 | 0.35 | 1.495 | 0.52 | 0.9 |
| ΔFogging/% | 0 | 71 | 207 | 0 | 327 | 49 | 157 |

TABLE 3 properties of HDPE used in the invention

| Grade | conventional ZN based HDPE BB2581 | Invention ZN based HDPE SCLAIR IG464-C |
|---|---|---|
| MFR(190/2, 16) (in g/10 min) | 0.3 | 10 |
| Density (in kg/m$^3$) | 0.958 | 0.964 |
| Comonomer (in wt %) | 0.2% (butene) | 0 |
| Hot hexane extractable (in %) | 1.89 ± 0.26 | 0.39 ± 0.01 |
| Soluble TREF (in wt %) | 2.34 | 0.6 |
| CO fraction (in wt %) | 12.74 | 4.53 |
| HO fraction (in wt %) | 84.92 | 94.87 |
| COHO (in %) | 17.8 | 5.4 |

From Table 2, Comparative Examples C.E.3 and C.E.4, respectively C.E.1 and C.E.2 it can be seen that when a conventional ZN based HDPE (BB2581) is added to a PP matrix material, both the FOG, VOC and Fogging values are increased considerably. C.E.6 shows that when a slip agent (e.g. Crodamide ER-BE-(HU)) is added too, the scratch resistance is clearly improved, but although the VOC value is also improved both the FOG and Fogging are tremendously deteriorated. So the slip agent shows an antagonistic effect with the HDPE. When instead of the conventional ZN based HDPE an HDPE with the properties specified in the invention (e.g. SCLAIR IG 464-C from Nova Chemicals) is added to the PP matrix then both the FOG, and Fogging values remain nearly constant; only a minor increase of those values is obtained whereas with regard to VOC even an improvement is achievable (see I.E.1) When a slip agent is added too, there is no deterioration of the FOG value and an acceptable increase of the Fogging value observed, thus in comparison to the use of conventional ZN based HDPE, the HDPE according to the invention shows no antagonistic effect with the slip agent. Compared to the comparative polymer compositions comprising the conventional ZN based polyethylene, the inventive polymer compositions show an increase in the FOG value of not more than 40%, in the VOC of not more than 35% and in Fogging of not more than 300%. Moreover there is no negative impact on the mechanical properties compared to the polypropylene base material shown, so that the inventive polymer composition is perfectly suitable for automotive and household applications.

The invention claimed is:

1. A polymer composition comprising:
    a) one or more of at least one polypropylene homopolymer or random copolymer,
    b) from 0.1 up to 15 wt % of at least one polyethylene,
    c) optionally at least one elastomer in an amount of 8 to 40 wt % and
    d) optionally one or more of fillers or additives in an amount of up to 45 wt % based on the total weight of the final polymer composition
    with the at least one polyethylene having a density of higher than 940 kg/m$^3$, a content of hexane hot extractables of below 0.80 wt %, and a copolymer/homopolymer (COHO) ratio measured by Temperature Rising Elution Fraction (TREF) of up to 6%.

2. The polymer composition according to claim 1 comprising:
    a) one or more of at least one polypropylene homopolymer or random copolymer,
    b) 5 to 15 wt % of at least one polyethylene having a density of higher than 940 kg/m$^3$, a content of hexane hot extractables of below 0.80 wt % and a copolymer/homopolymer ratio (COHO ratio) measured by Temperature Rising Elution Fraction (TREF) up to 6%,
    c) an elastomer in an amount of 10 to 30 wt %,
    d) up to 30 wt % fillers and e) up to 4 wt % additives, based on the total weight of the final polymer composition.

3. The polymer composition according to claim 1, comprising:
a) one or more of at least one polypropylene homopolymer or random copolymer,
b) 5 to 15 wt % of at least one polyethylene having a density of higher than 940 kg/m$^3$, a content of hexane hot extractables of below 0.80 wt % and a copolymer/homopolymer ratio (COHO ratio) measured by Temperature Rising Elution Fraction (TREF) up to 6%,
c) an elastomer in an amount of 10 to 30 wt %,
d) 5 to 30 wt % talc as a filler and
e) up to 4 wt % additives comprising 2 to 3 wt % of a colour masterbatch and 1 wt % of other additives, based on the total weight of the final polymer composition.

4. The polymer composition according to claim 1, wherein the one or more of at least one polypropylene homopolymer or random copolymer has a melt flow rate MFR$_2$ (230° C.) measured according to ISO 1133 in the range of 1 to 1000 g/10 min.

5. The polymer composition according to claim 1, wherein the content of the xylene cold soluble (XCS) fraction of the one or more of at least one polypropylene homopolymer or random copolymer is in the range of 0.1 to 6 wt %.

6. The polymer composition according to claim 1, wherein the at least one polypropylene has a glass transition temperature (Tg) in the range of −10 to +10° C.

7. The polymer composition according to claim 1, wherein the at least one polyethylene has a molar-mass dispersity DM of 2.5-4.

8. The polymer composition according to claim 1, wherein the at least one polyethylene has a comonomer content of 0 to 0.5 wt % based on the weight of the at least one polyethylene component.

9. The polymer composition according to claim 1, wherein the at least one polyethylene has a MFR$_2$ (190° C.) measured according to ISO 1133 of 0.2 to 15 g/10 min.

10. The polymer composition according to claim 1, wherein the at least one elastomer has been produced in the polymerization reaction step with ethylene or higher α-olefins like C$_4$ to C$_8$ being used as comonomers to the one or more of polypropylene homopolymer or random copolymer and wherein a heterophasic copolymer is obtained.

11. The polymer composition according to claim 1, wherein the MFR$_2$ (230° C.) measured according to ISO 1133 of the polymer composition is in the range of 5-100 g/10 min.

12. The polymer composition according to claim 1, wherein the polymer composition contains up to 1 wt % of a slip agent based on the total weight of the final polymer composition.

13. A method comprising producing polymer compositions with at least one polyethylene, the at least one polyethylene having a density of higher than 940 kg/m$^3$, a content of hexane hot extractables of below 0.80 wt % and a copolymer/homopolymer (COHO) ratio measured by Temperature Rising Elution Fraction (TREF) of up to 6%, the polymer compositions having a scratch resistance of below 3, an odour value of below 3.5 and a simultaneous increase of the FOG value of not more than 40%, the VOC value of not more than 35% and the Fogging of not more than 300% compared to the polymer matrix material.

14. A method comprising producing articles with reduced EFO with a polymer composition according to claim 1.

15. An article comprising a polymer composition, the polymer composition comprising:
a) one or more of at least one polypropylene homopolymer or random copolymer,
b) from 0.1 up to 15 wt % of at least one polyethylene,
c) optionally at least one elastomer in an amount of 8 to 40 wt % and
d) optionally one or more of fillers or additives in an amount of up to 45 wt % based on the total weight of the final polymer composition
with the at least one polyethylene having a density of higher than 940 kg/m$^3$, a content of hexane hot extractables of below 0.80 wt %, and a copolymer/homopolymer (COHO) ratio measured by Temperature Rising Elution Fraction (TREF) of up to 6%.

16. The polymer composition according to claim 1, wherein the content of hexane hot extractables is below 0.60 wt %.

17. The polymer composition according to claim 1, wherein the content of hexane hot extractables is below 0.40 wt %.

18. The method according to claim 13, wherein the at least one polyethylene has a content of hexane hot extractables of below 0.60 wt %.

19. The method according to claim 13, wherein the at least one polyethylene has a content of hexane hot extractables of below 0.40 wt %.

20. The article according to claim 15, wherein the article is an automotive interior or a houseware article.

* * * * *